(12) United States Patent
Simon et al.

(10) Patent No.: US 10,975,952 B2
(45) Date of Patent: Apr. 13, 2021

(54) REDUCTION- OR DIFFERENTIAL-TYPE DEVICE FOR A TURBINE ENGINE OF AN AIRCRAFT

(71) Applicant: SAFRAN TRANSMISSION SYSTEMS, Colombes (FR)

(72) Inventors: Adrien Louis Simon, Moissy-Cramayel (FR); Jean-Charles Michel Pierre Di Giovanni, Moissy-Cramayel (FR); Boris Pierre Marcel Morelli, Moissy-Cramayel (FR); Florian Rappaport, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 16/522,352

(22) Filed: Jul. 25, 2019

(65) Prior Publication Data

US 2020/0032893 A1   Jan. 30, 2020

(30) Foreign Application Priority Data

Jul. 26, 2018 (FR) ..................... 1856981

(51) Int. Cl.
*F16H 57/04* (2010.01)
*F02C 7/36* (2006.01)
(Continued)

(52) U.S. Cl.
CPC .......... *F16H 57/0401* (2013.01); *F02C 7/36* (2013.01); *F16H 1/2863* (2013.01); *F16H 2057/02073* (2013.01)

(58) Field of Classification Search
CPC ............. F16H 57/0401; F16H 57/0471; F16H 57/0479; F16H 57/0482; F16H 2057/02073; F16H 1/2863; F02C 7/36
See application file for complete search history.

(56) References Cited

U.S. PATENT DOCUMENTS 5,107,676 A * 4/1992 Hadaway ................ F01D 25/18
                                                184/6.11
10,006,539 B2 * 6/2018 Curlier ...................... F16H 1/28
(Continued)

FOREIGN PATENT DOCUMENTS

DE   243739 A1   3/1987
EP   2333250 A2  6/2011
(Continued)

OTHER PUBLICATIONS

Preliminary Research Report and Written Opinion received for French Application No. 1856981, dated Feb. 19, 2019, 8 pages (1 pages of French Translation Cover Sheet and 7 pages of original document).

*Primary Examiner* — Tisha D Lewis
(74) *Attorney, Agent, or Firm* — Womble Bond Dickinson (US) LLP

(57) ABSTRACT

Device of the reduction gear or differential type for a turbine engine of an aircraft. A central sun gear and a row of planet gears, each of the planet gears are rotationally guided by at least one bearing extending around a tubular support. The tubular support includes an inner cavity for the reception of oil and through-orifices for the passage of oil of the tubular support to the at least one bearing. A member for circulating the oil is mounted in the cavity and includes at least one oil duct intended to be connected to an oil supply. The oil is intended to flow from the at least one duct into the inner cavity to form an oil film in contact with said tubular support, and to flow through the orifices.

9 Claims, 4 Drawing Sheets

(51) Int. Cl.
*F16H 1/28* (2006.01)
*F16H 57/02* (2012.01)

(56) References Cited

U.S. PATENT DOCUMENTS

| | | | |
|---|---|---|---|
| 10,697,498 B2* | 6/2020 | Feraud | F16C 33/6674 |
| 2013/0225353 A1 | 8/2013 | Gallet et al. | |
| 2015/0176645 A1* | 6/2015 | Doki-Thonon | F16C 23/086 |
| | | | 384/392 |
| 2018/0163850 A1* | 6/2018 | Lao | F16H 57/0482 |

FOREIGN PATENT DOCUMENTS

| | | |
|---|---|---|
| FR | 2987416 A1 | 8/2013 |
| FR | 3041054 A1 | 3/2017 |
| GB | 2234035 A | 1/1991 |

* cited by examiner

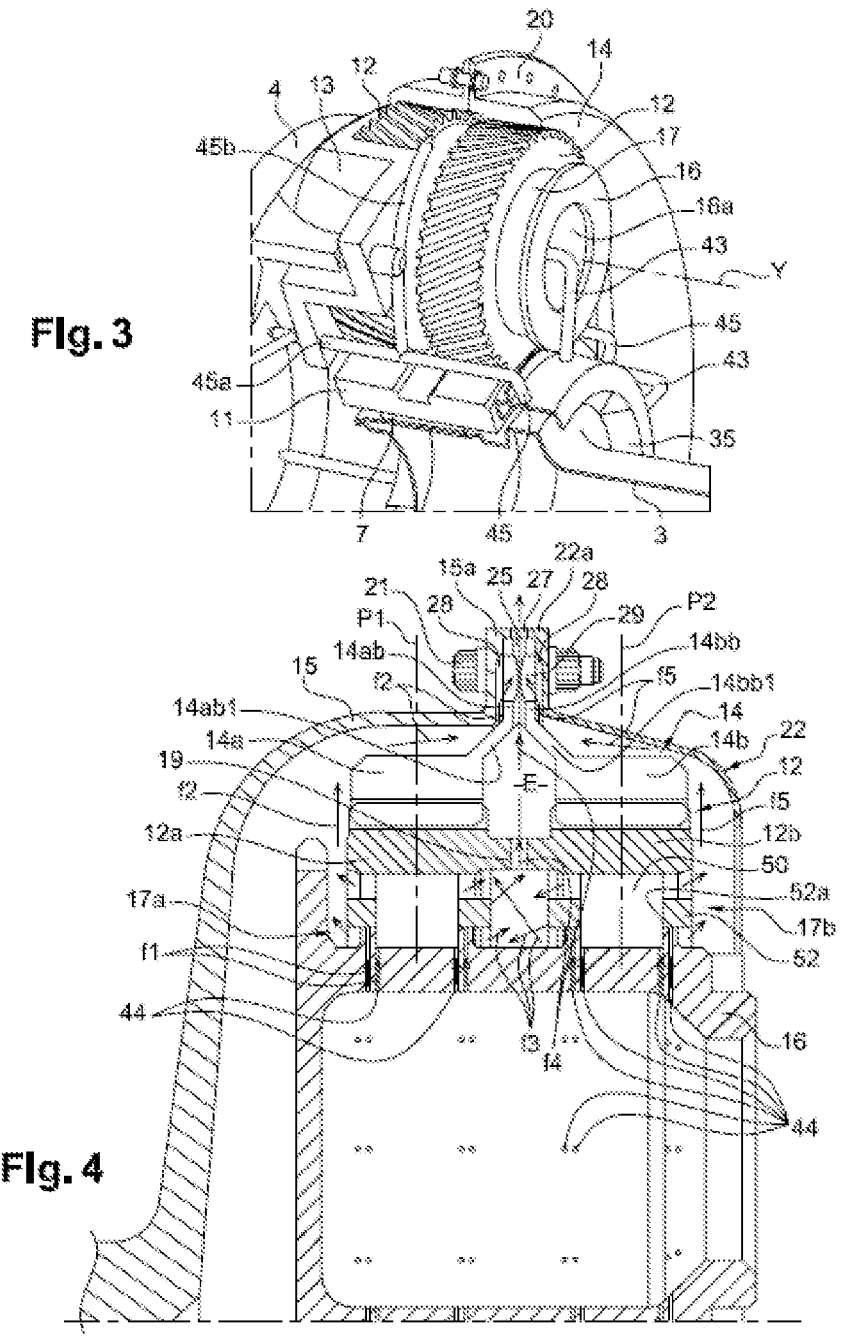

US 10,975,952 B2

REDUCTION- OR DIFFERENTIAL-TYPE DEVICE FOR A TURBINE ENGINE OF AN AIRCRAFT

FIELD OF THE INVENTION

The present invention relates to the field of reduction gears or mechanical differentials for a turbine engine, in particular of an aircraft.

STATE OF THE ART

The state of the art includes, in particular, documents, FR-A1-2 987 416, EP-A2-2 333 250, GR-A-2 234 035 and FR-A1-3 041 054. Current turbine engines, in particular turbine engines comprising one or more propellers generating a secondary flow, comprise a transmission system, termed reduction gear, to drive the propeller(s) at an adequate rotational speed from the turbine shaft driving the primary body of the engine.

The functioning of reduction gears, in particular in turbine engines provided with a fan propeller with an elevated dilution rate, requires a particularly high oil flow rate, of approximately 6,000 to 7,000 litres per hour during take-off, to ensure the lubrication and cooling of their pinions and bearings.

Among the reduction gears used, there are planetary reduction gears and epicyclic gear trains that feature the advantage of providing significant reduction rates of the rotational speed while taking up a limited amount of space.

Such a reduction gear comprises a planetary pinion or a central pinion, termed sun gear, and an outer ring gear with satellite pinions, termed planet gears, that are engaged with the sun pinion and the ring gear, the support of one of these three components having to be rotationally immobilised so that the gear train may function as a reduction gear.

When the planetary carrier is rotationally secured, the sun gear and the ring gear are driving and driven, respectively, or conversely. The reduction gear is then of the "planetary" type.

In the opposite and more frequent case of an epicyclic gear train reduction gear, the outer ring gear is rotationally immobilised and the sun pinion and planetary carrier are respectively driving and driven.

The same structure can be used to create a mechanical differential. In this case, all three components (sun gear, planet gears and ring gear) are rotationally mobile.

However, this type of reduction gear or differential has disadvantages relating to its lubrication.

According to the current technology, a planet gear is generally rotationally guided by a smooth bearing that extends around a tubular support of the planetary carrier, said tubular support comprising an inner cavity receiving the oil and substantially radial through-orifices for the passage of oil from the inner cavity to the smooth bearing. Another guiding solution would be to use bearings with rolling elements or roller bearings.

The heat generated by the passage of the mobile elements of a roller bearing must be, in this case, transferred as efficiently as possible to a heat-transfer fluid (in this case oil). To optimise the performance (yield), it is preferable to have two different oil temperatures: one for the roller bearings and the other for the teeth. Currently, the only way of achieving two different oil temperatures is to duplicate the oil circuits.

The present invention proposes to improve this technology with a simple, efficient and economical solution to this problem.

SUMMARY OF THE INVENTION

The invention relates to a reduction-type or differential-type device for an aircraft turbine engine, comprising a central sun gear with a rotation axis X, a ring gear extending around the axis X and the sun gear, a planetary carrier supporting an annular row of planet gears arranged between the sun gear and the ring gear, and engaged with the sun gear and the ring gear, the planet gears having rotation axes Y substantially parallel to said axis X, said sun gear comprising means for coupling to a shaft of the turbine engine and at least one among the planetary carrier and the ring gear comprising means to connect to another shaft of the turbine engine, each of said planet gears being rotationally guided by at least one bearing extending around a tubular support of axis Y of said planetary carrier, the tubular support comprising an inner cavity to receive the oil and substantially radial through-orifices for the passage of the oil from an internal annular surface of said tubular support to said at least one bearing, characterised in that an oil-transfer member is mounted in said cavity and comprises at least one oil duct intended to be connected to oil supply means and which is connected to a ring that extends about the axis Y and delimits with said internal annular surface an annular space for the circulation of oil, the oil being intended to flow from said at least one duct into said space to form a film of oil in contact with said tubular support, and then to pass through said orifices, said member comprising a first axial duct extending along the axis Y and at least a second radial duct extending between the first duct and said ring, said first duct being formed in a cylindrical portion of the member, and said at least one second duct being formed in a disc connecting said cylindrical portion to the inner periphery of the ring.

The device can thus be a planetary-type or epicyclic-type reduction gear or a mechanical differential. The invention proposes heating the oil prior to the lubrication of the bearing. For this purpose, the invention proposes circulating "cold" oil in contact with and inside the tubular support. The oil is therefore intended to form an oil film that heats while in contact with the tubular support and therefore arrives "hot" at the bearing, at a predetermined temperature for an optimal yield, while also having evacuated the heat of the bearing. The invention thus proposes using only one oil circuit instead of the two currently recommended, by using the losses of the bearing to heat the oil before it arrives at the bearing.

The device according to the invention can comprise one or several of the following features, taken individually or in combination:
  said disc is connected substantially at the middle of said ring,
  the ducts can be made by machining or any other suitable technique,
  said cylindrical portion is connected by an axial end to said disc and by an opposite axial end to another disc, the outer periphery of which comes to bear radially on an internal cylindrical surface of said tubular support; this guarantees an accurate positioning of the member in the support, and limits the risks of relative displacements of these parts during operations, said opposite axial end comprises a port to connect to said supply means; the port can cooperate by male-female snap-fitting with the oil supply means, said ring is cylindrical and said space has a substantially constant thickness over its entire length; it should therefore be understood that the oil film has a substantially constant thickness, this thickness being determined as a function of the viscosity of the oil, so as to absorb a given amount of heat from the bearing during operations, said ring has an axial cross-section with biconical shape and comprises two frusto-conical parts connected to one another and to said at least one duct by their smallest diameter ends, a biconical shape of the ring facilitating the guiding and flow of the oil during operations, said frusto-conical parts have a predetermined angle $\alpha_0$ with respect to said internal annular surface, and the ring is configured so that said oil film has a predetermined thickness $e_0$, at least one gasket is mounted between each axial end of the ring and the inner annular surface of said tubular support; the gasket is an o-ring seal for example, and ensures that no oil can penetrate between the ring and the support, said member is formed of a single part; this facilitates the mounting of the member, said bearings are of the roller bearing type, and preferably comprise at least two annular rows of rollers arranged next to one another; in another version, there could be three bearings or more arranged next to one another, the support comprises radially external annular ribs that define with one another the external annular grooves for receiving the rows of roller bearings, at least some of said orifices extending into the ribs and/or opening at the bottom of said grooves; it should therefore be understood that the inner rings of the bearings are formed from a single part with the annular support, which is advantageous and simplifies mounting operations.

The present invention further relates to an aircraft turbine engine, characterised in that it comprises at least one device such as described above.

BRIEF DESCRIPTION OF THE FIGURES

Other characteristics and advantages will appear more clearly upon reading the following description of a non-limiting embodiment of the invention and with reference to the appended drawings, in which:

FIG. 3 is a cut-away perspective view of the reduction gear, FIG. 4 is a cross-sectional view of a device of the reduction gear-type or of the differential-type, in which the guiding bearings of the planet gears are roller bearings.

DETAILED DESCRIPTION OF AN EMBODIMENT OF THE INVENTION

Figure 1:
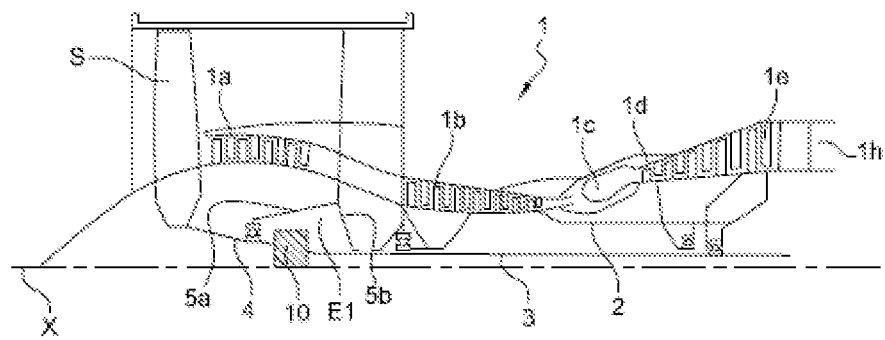
FIG. 1 is a schematic axial cross-sectional view of a turbine engine in accordance with the invention.

FIG. 1 shows a turbine engine 1 that comprises, conventionally, a propeller of a fan S, a low-pressure compressor 1a, a high-pressure compressor 1b, an annular combustion chamber 1c, a high-pressure turbine 1d, a low pressure-turbine 1e, and an exhaust pipe 1h. The high-pressure compressor 1b and the high-pressure turbine 1d are connected by a high-pressure shaft 2 and form with the latter a high-pressure (HP) body. The low-pressure compressor 1a and the low-pressure turbine 1e are connected by a low-pressure shaft 3 and form with the latter a low-pressure (BP) body.

The propeller of the fan S is driven by a fan shaft 4 coupled to the BP shaft 3 by means of a reduction gear 10 with an epicyclic, planetary or differential train, shown here schematically.

The reduction gear 10 is positioned in the front part of the turbine engine. A fixed structure comprising schematically, in this case, an upstream section 5a and a downstream section 5b is arranged to form an enclosure E1 around the reduction gear 10. This enclosure E1 is here closed in the upstream section by gaskets located at the level of a bearing and allowing the passage of the fan shaft 4, and in the downstream section by gaskets located at the level of the passage of the BP shaft 3.

Figure 2:
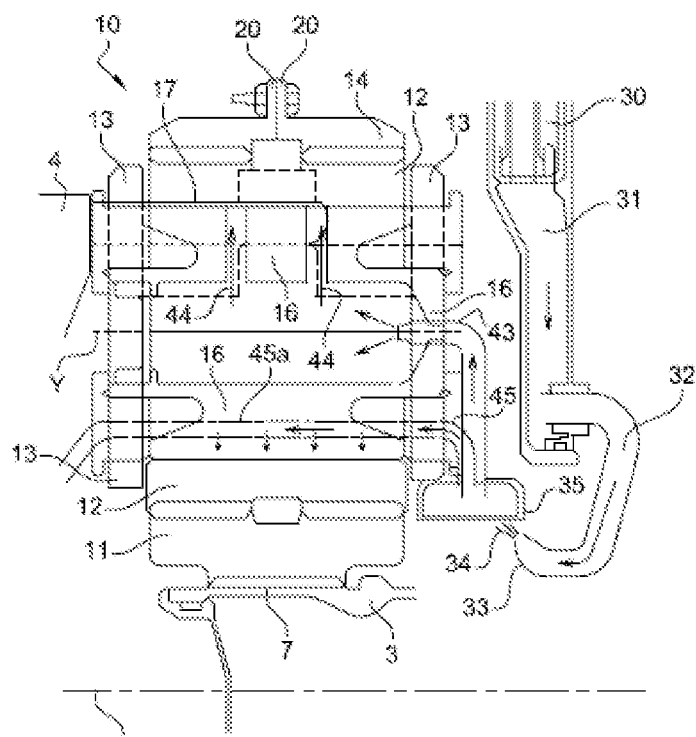
FIG. 2 is an axial cross-sectional view of a reduction gear.

With reference to FIG. 2, the reduction gear 10 comprises a ring gear 14 that is secured by means of a ring gear carrier (not shown) to the fixed structure 5a, 5b, with flexible means to allow it to follow possible displacements of the fan shaft 4, for example, in certain downgraded operating modes. In the planetary architecture, the ring gear carrier is made of a part that is more or less flexible and that drives the ring gear, and of a part maintained by roller bearings or bearings whereon the fan is mounted. These attachment means are known to the person skilled in the field and are not detailed herein. A short description thereof can be found, for example, in FR-A1-2987416.

The reduction gear 10 is connected to the BP shaft 3 by means of splines 7 that drive a planetary or sun gearing pinion 11, and on the other hand to the fan shaft 4, which is attached to a planetary carrier 13. Conventionally, the sun pinion 11, the rotation axis X of which is the same as that of the turbine engine, drives a series of planet pinions or planet gears 12 that are regularly distributed around the circumference of the reduction gear 10. The number of planet gears 12 generally ranges from three to seven. The planet gears 12 generally rotate about an axis X of the turbine engine, except in the case of a planetary gear where they rotate only about their axes of revolution Y, engaging with internal herringbone teeth of the ring gear 14, which is secured to a stator of the turbine engine by means of flanges 20 in the case of an epicyclic gear train or secured to a rotor of the turbine engine in the case of a planetary gear. Each of the planet gears 12 rotates freely about an axis Y defined by a tubular support 16 carried by the planetary carrier 13, by means of a bearing 17 that is generally smooth according to the current state of the art.

The rotation of the planet gears 12 about the axis Y, due to the cooperation of their teeth with the teeth of the ring gear 14, drives the rotation of the planetary carrier 13 about the axis X, and consequently that of the fan shaft 4 to which it is connected, at a rotational speed that is inferior to that of the BP shaft 3.

FIG. 2, along with FIG. 3, shows the path of the oil towards the reduction gear 10 and its path inside the reduction gear. In FIG. 2, the arrows show the path taken by the oil from, in this example, a surge tank 31 connected to the fixed structure of the turbine engine, all the way to the pinions and the bearings 17 that require lubrication.

The lubrication device comprises schematically three parts that are described in succession below, a first part connected to the fixed structure and delivering oil to the rotating parts of the reduction gear 10, a spinning wheel rotating with the planetary carrier 13 receiving the oil, and oil distribution circuits supplied with oil by the spinning wheel to bring it to the parts that require lubrication. The first part comprises at least one injector 32, the calibrated end of which is narrowed to form a nozzle 33. The oil is brought to the injector by a circulation pipe 30 coming from the engine of the tank (not shown). A surge tank 31 can be installed next to the reduction gear 10 on the pipe, preferably in the high portion, so that the oil can flow towards the centre of the reduction gear by gravity. The nozzle 33 ejects oil in the form of a spray 34 that is formed under the effect of the pressure generated jointly by the supply pump (not show) and by the weight of the oil column above it. The nozzle 33 is positioned here radially inside the planetary carrier 13 with respect to the axis X and the spray 34 is oriented with a radial component directed towards the outside of the reduction gear 10. With reference to FIG. 3, the spinning wheel for the reception of oil relating to the planetary carrier 13 comprises essentially a cylindrical cup, in this case with a U-shaped cross-section, its U-shaped opening oriented towards the rotation axis X. The spinning wheel is arranged on the planetary carrier 13 so that the bottom of the U of the cup 35 collects the oil spray 34 ejected by the nozzle 33.

In this case, there are two types of oil distribution circuits. A first series of oil distribution circuits corresponds to the first pipes 43, which are regularly distributed about the circumference of the reduction gear 10 and equal in number to that of the planet gears 12. These pipes 43 extend radially from the cup 35 and penetrate into the inner cavity 16a of each support 16 (FIG. 3), which is sealed by the planetary carrier 13. The oil circulating in the first pipes 43 penetrates into the inner cavity 16a and is driven by centrifugal force into the orifices 44 that pass through each support 16 as they are oriented radially. These orifices 44 open onto the periphery of the supports 16, at the level of the bearings supporting the pinions of the planet gears 12 and thereby ensure the lubrication of these bearings. The second series of oil distribution circuits comprises the second pipes 45 that extend, from the cup 35 through the planet gears 12 and are divided into several pipes 45a, 45b. The pipes 45a, 45b transport the oil towards the gears formed by the pinions of the planet gears 12 and the sun gear 11, on one hand, and by the pinions of the planet gears 12 and the outer ring gear, on the other hand. Each pipe 45a extends axially along the pinions of a planet gear 12, between said pinions and the sun gear 11, and forms a lubrication ramp on the entire width of the pinions. The pipe 45b that supplies the gear between the ring gear 14 and the pinions of the planet gears 12 projects its oil at the centre of the cylinder formed by each planet gear 12. As shown, each planet gear 12 is in the form of two parallel pinions that engage respectively with the two half ring gears of the ring gear 14 (FIG. 3). The helixes of the teeth of each planet gear are oriented diagonally with respect to the axis Y of rotation of the planet gear 12, so as to provide them with the function of grooves in which the oil is driven, from the middle of the cylinder to its periphery, to lubricate the gear on its entire width.

Although the above description relates a planetary reduction gear or an epicyclic gear train, it also applies to a mechanical differential in which the three components, i.e. the planetary carrier 13, the ring gear 14 and the sun gear 11 are rotationally mobile, the rotation speed of one of these components depending on the speed differential of the two other components, in particular.

FIG. 4 shows the case where the planet gears 12 of a device of the reduction gear type or of the differential type are centred and rotationally guided on the tubular supports 16 of the satellite carrier 13, by a bearing with one or several rows of rolling elements 17a, 17b. The rows of rolling elements 17a, 17b are called "bearings" hereinafter.

Figure 5:
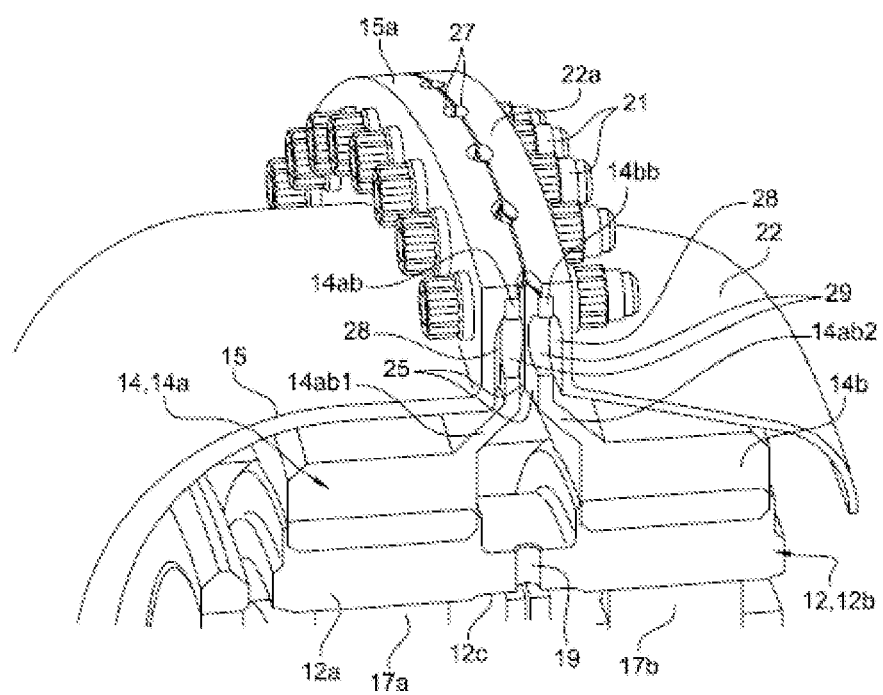
FIG. 5 is a cross-sectional perspective view of a part of the device of FIG. 4.

In the examples of FIGS. 4 and 5, each support 16 is surrounded by the two bearings 17a, 17b, which are roller bearings in the example shown. In this example, each bearing 17a, 17b is associated with a helix 12a, 12b of the herringbone teeth of the planet gear 12, which is itself geared with two half ring gears 14a, 14b as mentioned above. In other words, the bearings 17a, 17b are coaxial and arranged one next to the other, each bearing being located in a median plane P1, P2 substantially intersecting with the median plane of each helix 12a, 12b of the pinion of the planet gear 12 and by the median plane of the helix of a half ring gear 14a or 14b. The planes P1 and P2 are parallel with one another and perpendicular to the axis Y. The number of bearings 17a, 17b can be different from the example shown. It does not necessarily depend on the number of helixes 12a, 12b, 14a, 14b of herringbone teeth.

Each bearing 17a, 17b comprises an annular row of roller bearings 50 (rollers) arranged in a cage 52 that is formed by a cylindrical ring comprising an annular row of through-apertures 52 for receiving the roller bearings. The cages 52 are independent and axially offset from one another. In the case shown in the drawings, the rings or the inner and outer tracks of each bearing are formed as a single part with the support 16, on one hand, and the planet gear 12, on the other hand.

As is seen in FIG. 4, the bearings 17a, 17b are at an axial distance from one another. This is also the case for the helixes 12a, 12b of the pinion of the planet gear 12 and the helixes of the half ring gears 14a, 14b. The helixes 12a, 12b are connected by a cylindrical shroud made of a material that comprises an annular row of boreholes 19 required for the oil to flow during operations and to avoid needing boreholes in the herringbone teeth.

Each half ring gear 14a, 14b comprises an annular body with a general cylindrical shape and connected to an annular flange 14ab, 14bb that extends radially outwards. Each body comprises an internal helix. Although it is not shown in the drawings, the helixes of the half ring gears fit with the helixes 12a, 12b of the planet gear, which are of the type shown in FIG. 3. The helixes of the two half ring gears 14a, 14b therefore feature a herringbone configuration.

The body of each half ring gear is connected by one of its longitudinal ends to the corresponding flange 14ab, 14bb by means of an annular rim 14ab1, 14bb1.

Each flange 14ab, 14bb extends substantially in a radial direction and bears against the other flange in a substantially radial joint plane P. The rims 14ab1, 14bb1 here have a general frusto-conical shape and converge towards one another radially outwards.

The flanges 14*ab*, 14*bb* are provided to secure the half ring gears 14*a*, 14*b* to one another, as well as to a ring gear carrier 15 and to an oil collector 22 in the example shown.

For this purpose, the flanges 14*ab*, 14*bb* each comprise an annular row of axial through-orifices for the passage of attachment means 21 of the screw-nut type or similar. The orifices of the flanges are aligned and receive the attachment means 21.

The ring gear carrier 15 also comprises an annular flange 15*a* for attachment to the flanges 14*ab*, 14*bb*. The flange 15*a* is applied axially on one of the flanges 14*ab*, 14*bb*, namely the flange 14*ab* in the example shown. The flange 14*ab* is thus inserted axially between the flange 15*a* and the flange 14*bb*. The inverse configuration is also possible.

The flange 15*a* comprises orifices that are aligned with the orifices of the flanges 14*ab*, 14*bb* and that also receive the attachment means 21, the heads of which can be applied axially on the upstream face of the flange 15*a* and nuts can be applied axially on the downstream face of the flange 14*bb* or conversely. In the example shown, a flange 22*a* of the annular oil collector bears axially against the flange 14*bb* and receives on its downstream face the heads of the nuts. The flange 22*a* comprises orifices aligned with the orifices of the flanges 14*ab*, 14*bb*, 15*a* and that also receive the attachment means 21.

The rims 14*ab*1, 14*bb*1 delimit an annular space E that features here a cross-section with a general triangular shape, the tip of which is radially oriented outwards.

Due to the shape of these rims 14*ab*1, 14*bb*1 and their connection, respectively, to the downstream and upstream longitudinal ends of the bodies of the half ring gears, these bodies are axially spaced from one another by a predetermined distance.

The inter-helix axial distance 12*a*, 12*b* can be the result of manufacturing constraints. Each planet gear comprises an inner roller track. In order to reduce the actual surface to be machined to the required amount, this internal cylindrical surface is divided into several tracks of reduced axial length, the number of which is equal to the number of bearings 17*a*, 17*b*. This provides an annular groove 12*c* for the collection of oil between the tracks, it reduces the weight because the planet gear is less subject to constraints at that location and it reduces manufacturing complexity for elements that require a high degree of accuracy, as several tracks are created independently from one another and the total surface featuring a high degree of accuracy is smaller with the grooves between each track. The boreholes 19 are formed at the bottom of this groove 12*c*.

The lubricating oil is intended to flow during operations through the inter-body space E. Substantially radial passages are provided between the flanges 14*ab*, 14*bb* to allow the evacuation of oil radially outside of the ring gear 14.

The oil passages are here formed on one hand by substantially radial crescent-shaped notches 25 formed in the surfaces facing the flanges 14*ab*, 14*bb*. Each flange 14*ab*, 14*bb* comprises an annular row of crescent-shaped notches 25 axially aligned with the crescent-shaped notches 25 of the other of the flanges. The crescent-shaped notches are created at a distance from the orifices for the passage of the attachment means 21. Each crescent-shaped notch has, for example, a cross-section with a semi-circular shape (semi-oblong shape) or a rectangular shape.

The crescent-shaped notches 25 fluidly connect, at their radially internal ends, with the space E, and at their axially external ends, with the notches 27 for the output of oil provided on the cylindrical rims located on the outer periphery of the flanges 15*a*, 22*a* (FIG. 4).

Oil passages are further formed by substantially radial crescent-shaped notches 28 formed in the bearing surfaces of the flanges 22*a*, 15*a* (FIG. 4). Each flange 22*a*, 15*a* comprises an annular row of crescent-shaped notches. The crescent-shaped notches 28 are provided at a distance of the orifices for the passage of the attachment means 21 and communicate with the through-orifices 29 provided at the bottom of the crescent-shaped notches 25 of the flanges 14*ab*, 14*bb*. Each crescent-shaped notch has, for example, a cross-section with a semi-circular shape (semi-oblong shape) or a rectangular shape.

The oil that flows through the orifices 44 of the support 16 (arrows f1) lubricates the bearings 17*a*, 17*b* and must then flow radially outwards from these bearings. The lubrication will serve to cool the rolling elements as well as the cage 52. Once these elements cooled, the lubrication can follow one of three possible paths:

Path No. 1—Arrows f2

The lubricating oil is ejected from the front side of the reduction gear (or through the left end of the roller bearing on the drawing) and raises through the ring gear carrier 15 to reach the crescent-shaped notches 28; it is then transferred through the orifices 29 between the flanges 14*ab*, 14*bb* of the half ring gears to be ejected through the notches 27;

Path No. 2—Arrows f3 and f4

The lubricating oil is trapped between the bearings 17*a*, 17*b*; under the effect of centrifugal forces, gravity and ventilation, the lubricating oil is sent to the circular groove 12*c* located between the two inner rolling tracks (arrows f3), then exits the planet gear 12 through the boreholes 19 to arrive in the space E formed by the two assembled half ring gears (arrows f4); at the end of this cavity, the crescent-shaped notches 25 and the notches 27 eject the oil from the reduction gear by centrifugal force of the rotating ring gear;

Path No. 3—Arrows f5

The lubricating oil is ejected from the rear side of the reduction gear (or through the right end of the roller bearing on the drawing) and raises through the oil collector 22 to reach the crescent-shaped notches 28; it is then transferred through the orifices 29 of the flange of the rear half ring gear to be ejected by the central path formed by the notches 27 of the two assembled half ring gears.

In the configuration shown in FIG. 4, the flow of oil from the orifices 44 to the space E is not optimised. The oil of path No. 2 may stagnate and reduce its lubricating and cooling efficiency on the bearings 17*a*, 17*b*. The cages 52 of the bearings 17*a*, 17*b* comprise peripheral facing rims that are identical and at an axial distance from one another, and that are not adapted to guiding the oil during operations.

Figure 6:
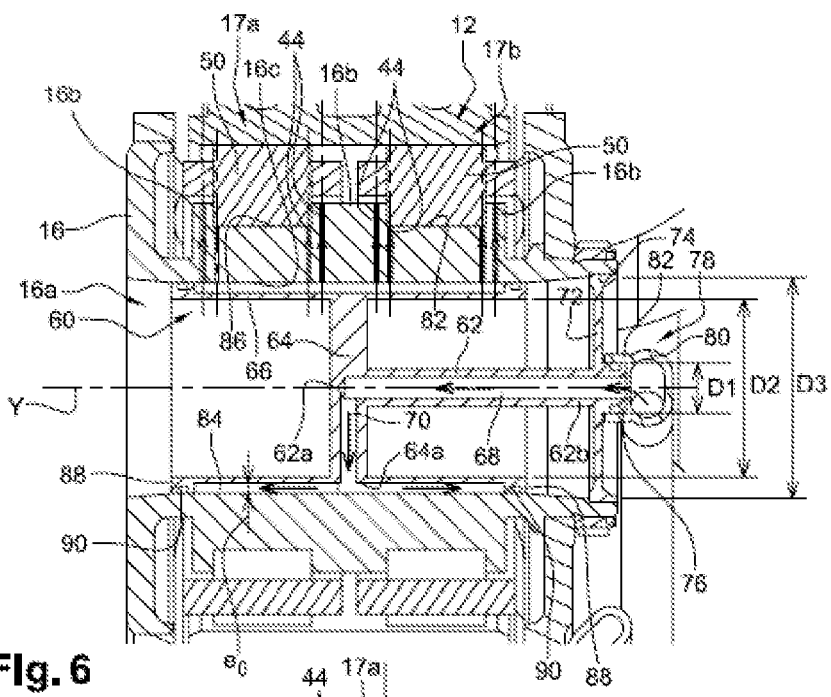
FIG. 6 is a cross-sectional view of a device of the reduction gear-type or of the differential-type, provided with a member to transport oil according to one embodiment of the invention.
Figure 7:
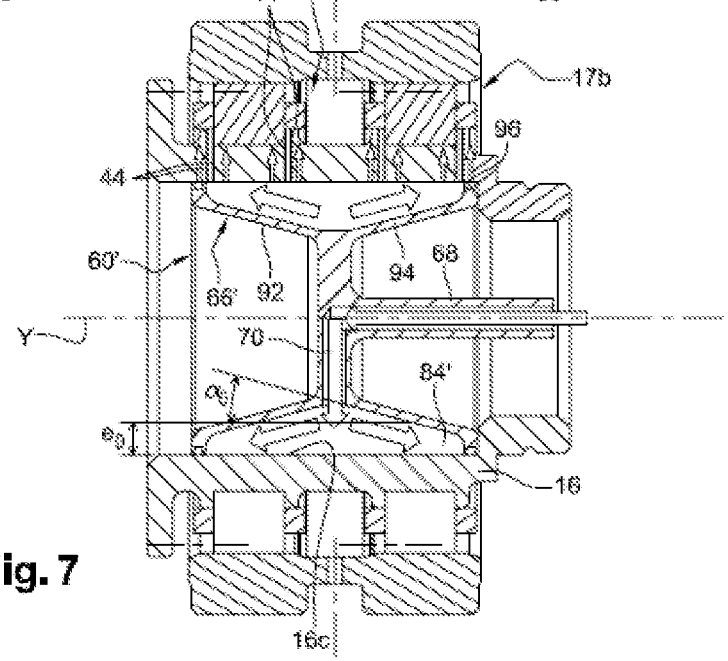
FIG. 7 is a cross-sectional view of a device of the reduction gear type or of the differential-type, provided with a member to transport oil according to an alternative embodiment of the invention.

FIGS. 6 and 7 show two embodiments of the invention. This invention relates to a reduction gear or a differential such as described above.

In these embodiments, the device is equipped with an oil-transfer member 60 mounted in the cavity 16*a* of each tubular support 16.

The member 60 essentially comprises three parts, i.e. a cylindrical portion 62, a disc 64 and a ring 66. The member 60 is in this case formed from a single part, but this feature is not limiting.

The portion 62 extends along the axis Y and has an outer diameter D1. It comprises an inner duct 68, called first duct, which extends along the axis Y over nearly the entire length of the portion 62 in the example shown.

The portion 62 has an axial end 62*a* connected to the centre of the disc 64, of which the outer periphery is connected to the ring 66. The disc 64 extends in a plane that is substantially perpendicular to the axis Y and comprises an inner duct 70, termed second duct, that extends radially, and of which the radially internal end is connected to the axial end of the duct 68 located at the end 62a, and of which the radially external end opens onto an external annular surface 64a of the disc.

The disc 64 is substantially connected to the middle of the ring 66 (along the axis Y), so that the duct 70 substantially opens onto the middle of the ring 66. The disc 64 could comprise several radial ducts 70 regularly spaced about the axis Y.

The portion 62 has an opposite axial end 62b connected to the centre of another disc 72, the outer periphery of which bears radially against an internal cylindrical surface 74 of the support 16, which is here located at an axial end thereof. The portion 62 extends axially beyond the disc 72 to form a connection port 76 of the duct 68 to the supply means 78, The supply means 78 for example comprise an annular ramp 80 connected to a source of lubricating oil and comprising an annular row of connections 82 snap-fitted on the ports 76 of the members 60 mounted in the various supports 16. The ramp 80 extends in this case about the axis X. O-rings can be provided between the ports 76 and the connections 82 of the ramp 80. The ring 66 extends about the axis Y and delimits with an internal annular surface 16c of the support 16 an annular space 84 for the circulation of oil.

As mentioned above, these orifices 44 pass radially through the tubular wall of the support 16. In the example shown, the support 16 comprises radially external annular ribs 16b that define external annular grooves 86 for the reception of the roller bearings 50. The ribs 16b thus serve as axial abutments for the rolling elements of the bearings 17a, 17b. At least some of the orifices 44 extend to the radially external free ends of the ribs 16b. Others extend into the grooves 86. The radially internal ends of the orifices 44 open onto the surface 16c.

The length of the ring 66 is determined so that all the orifices 44 open into the space 84. In the shown example, it has a length that represents 50 to 80% of the length of the support 16, measured along the axis Y.

The ring 66 of FIG. 6 has a cylindrical general shape and extends at a predetermined radial distance from the surface 16c. This distance enables to define a thickness $e_0$ of an oil film intended to be formed between the ring 66 and the support 16. The thickness $e_0$ is substantially constant over the entire length of the film.

The ring has an internal diameter D2 significantly greater than D1 and an external diameter D3 substantially equal to the inner diameter of the surface 16c, or slightly inferior thereto.

The ring 66 comprises a radially external annular rim 88 at each of its axial ends. Each rim 88 comprises an annular groove 90 opening radially outwards and in which an annular gasket is intended to be housed and cooperate with the surface 16c.

The arrows of FIG. 6 show the path of the oil from the supply means to the bearings 17a, 17b. The oil exits the ramp 80 and penetrates into the duct 68 through the port 76. It flows in the ducts 68, 70 and penetrates into the space 84 to form the oil film. The oil flows along the surface 16c and is heated when it comes into contact with the support 16 because of the heat generated by the bearings 17a, 17b during operations. The oil thus heated flows through the orifices to reach the bearings 17a, 17b for their lubrication.

The member 60' of the embodiment of FIG. 7 differs from the member 60 described above essentially in that its ring 66' has a different shape.

The cross-section of the ring 66' has a biconical shape and comprises two frusto-conical parts 92, 94 connected to one another and to the disc 64 by their smallest diameter ends. The ring has a plane of symmetry intersecting with the disc 64 and perpendicular to the axis Y.

Each frusto-conical part 92, 94 is at a predetermined angle $\alpha_0$ with respect to the surface 16c, this angle being measured in an axial plane such as the cross-section plane of FIG. 7.

The member 60' of the embodiment of FIG. 7 further differs from the member 60 in that the ring 66' bears axially at one of its axial ends against an internal annular shoulder 96 of the support 16. Although the connection port 76 connecting the member 60' to the oil supply means is not shown, the member 60' does in fact comprise such a port.

The arrows of FIG. 7 show the path of the oil from the supply means to the bearings 17a, 17b. The oil flows in the ducts 68, 70 and penetrates into the space 84' to form the oil film, which has an average thickness $e_0$. The oil flows along the surface 16c and is heated when it comes into contact with the support 16 because of the heat generated by the bearings 17a, 17b during operations. The oil thus heated flows through the orifices to reach the bearings 17a, 17b for their lubrication.

By way of example, a first dimensioning under lubricating conditions and with the estimated losses with current bearings provides a potential increase of the oil temperature ranging from 10° C. to 60° C., by acting on the average thickness $e_0$ of the oil film and its angle $\alpha_0$. The yield calculations estimate that a roller bearing lubrication temperature 40° C. greater than the temperature of the teeth would be advantageous.

The invention in particular enables the use of a single oil circuit. As the teeth require oil that is not as hot as that required by the roller bearings, it is now possible to heat the oil prior to its injection into the roller bearings, while cooling the tubular support forming the inner ring of the bearing. This is a saving in terms of oil circuits and therefore reduces the weight for an increased yield of the engine. The invention also enables limiting the weight of the device, the only structural part being the tubular support, and to homogenise the constraints in the tubular support through the absence of tightening and shrinkage.

The invention claimed is:

1. A reduction or differential device for an aircraft turbine engine, comprising a central sun gear with a rotation axis X, a ring gear extending around the axis X and the sun gear, a planetary carrier supporting an annular row of planet gears arranged between the sun gear and the ring gear, and engaged with the sun gear and the ring gear, the planet gears having rotation axes Y substantially parallel to said axis X, said sun gear being configured to be coupled to a shaft of the turbine engine and at least one of the planetary carrier and the ring gear being configured to be connected to another shaft of the turbine engine, each of said planet gears being rotationally guided by at least one bearing extending around a tubular support of axis Y of said planetary carrier, the tubular support comprising an inner cavity to receive oil and substantially radial through-orifices for the passage of oil from an internal annular surface of said tubular support to said at least one bearing, wherein an oil-transfer member is mounted in said cavity and comprises at least one oil duct intended to be connected to an oil supply and which is connected to a ring that extends about the axis Y and delimits with said internal annular surface, an annular space for the circulation of oil, oil being intended to flow from said at least one duct into said space to form a film of oil in contact with said tubular support, and then to pass through said orifices, said member comprising a first axial duct extending along the axis Y and at least a second radial duct extending between the first duct and said ring, said first duct being formed in a cylindrical portion of the member, and said at least one second duct being formed in a disc connecting said cylindrical portion to the inner periphery of the ring.

2. The device according to claim 1, wherein said disc is connected substantially to the middle of said ring.

3. The device according to claim 1, wherein said cylindrical portion is connected by an axial end to said disc and by an opposite axial end to another disc of which the outer periphery bears radially against an internal cylindrical surface of said tubular support.

4. The device according to claim 3, wherein said opposite axial end comprises a port for connecting to said oil supply.

5. The device according to claim 1, wherein said ring is cylindrical and said space has a substantially constant thickness ($e_0$) over its entire length.

6. The device according to claim 1, wherein a cross-section of said ring has a biconical shape and comprises two frusto-conical parts connected to one another and to said at least one duct by their smallest diameter ends.

7. The device according to claim 6, wherein said frusto-conical parts have a predetermined angle ($\alpha_0$) with respect to said internal annular surface, and the ring is configured so that said oil film has a predetermined thickness ($e_0$).

8. The device according to claim 1, wherein at least one gasket is mounted between each axial end of the ring and the internal annular surface of said tubular support.

9. Turbine engine of an aircraft, comprising at least one device according to claim 1.

\* \* \* \* \*